United States Patent
Fediakine et al.

(10) Patent No.: US 7,826,740 B2
(45) Date of Patent: Nov. 2, 2010

(54) APPARATUS AND METHOD FOR ADAPTIVE ADJUSTMENT AND PERFORMANCE MONITORING OF AVALANCHE PHOTO-DIODE OPTICAL RECEIVER AND LASER TRANSMITTER FOR FIBER LINK LONG HAUL APPLICATIONS

(75) Inventors: Nikolai Fediakine, San Jose, CA (US); Shinkyo Kaku, San Jose, CA (US); Vitali Tikhonov, San Jose, CA (US)

(73) Assignee: Allied Telesis Inc., San Jose, CA (US)

( * ) Notice: Subject to any disclaimer, the term of this patent is extended or adjusted under 35 U.S.C. 154(b) by 739 days.

(21) Appl. No.: 11/785,631

(22) Filed: Apr. 19, 2007

(65) Prior Publication Data

US 2007/0248357 A1    Oct. 25, 2007

Related U.S. Application Data

(63) Continuation-in-part of application No. 11/522,517, filed on Sep. 18, 2006, now abandoned, and a continuation-in-part of application No. 11/522,515, filed on Sep. 18, 2006, now abandoned.

(60) Provisional application No. 60/717,193, filed on Sep. 16, 2005, provisional application No. 60/717,194, filed on Sep. 16, 2005.

(51) Int. Cl.
*H04B 10/08* (2006.01)

(52) U.S. Cl. .............................. 398/38; 398/25; 398/27
(58) Field of Classification Search .............. 398/23–28, 398/38, 202, 182
See application file for complete search history.

(56) References Cited

U.S. PATENT DOCUMENTS

| | | | |
|---|---|---|---|
| 2004/0008996 A1* | 1/2004 | Aronson et al. | 398/202 |
| 2005/0078916 A1* | 4/2005 | Hosking | 385/88 |
| 2005/0201431 A1* | 9/2005 | Hofmeister et al. | 372/29.015 |
| 2005/0207696 A1* | 9/2005 | Welch et al. | 385/14 |
| 2007/0053688 A1 | 3/2007 | Benz et al. | |

* cited by examiner

*Primary Examiner*—Dzung D Tran
(74) *Attorney, Agent, or Firm*—Arent Fox LLP

(57) ABSTRACT

A system and method for an Avalanche photo-diode ("APD") optical receiver and laser system to adjust its performance during system operation without disturbing network traffic. Very small changes may be adaptively applied to some key portions of the system by controlling a set of main system parameters including Q-factor; Bit Error Rate (BER); histograms of "1" and "0" levels; input optical power; and laser output power. This adaptive routine may be performed during operation of the system to keep the main system parameters close to their optimum value. During adjustment, the system may be divided into separate portions. The adjustment of each portion may be independent of the other portions of the system. For the optical network system, optimization and priority of different portions may be assigned based on network channel architecture.

10 Claims, 11 Drawing Sheets

APPARATUS AND METHOD FOR ADAPTIVE ADJUSTMENT AND PERFORMANCE MONITORING OF AVALANCHE PHOTO-DIODE OPTICAL RECEIVER AND LASER TRANSMITTER FOR FIBER LINK LONG HAUL APPLICATIONS

BRIEF DESCRIPTION OF INVENTION

This application is a continuation-in-part of U.S. patent application Ser. No. 11/522,517 filed on Sep. 18, 2006 now abandoned, which is based upon and claims the benefit of priority from the prior U.S. Provisional Application No. 60/717,193 filed on Sep. 16, 2005, and is a continuation-in-part of U.S. patent application Ser. No. 11/522,515 filed on Sep. 18, 2006 now abandoned, which is based upon and claims the benefit of priority from the prior U.S. Provisional Application No. 60/717,194 filed on Sep. 16, 2005, the entire contents of each of which are incorporated herein by reference.

The present invention is generally directed to an Avalanche photo-diode ("APD") optical receiver and laser system that can adjust its performance during system operation without disturbing network traffic. Specifically, the present invention is directed to adaptively apply small changes to key portions of the system by controlling a set of main system parameters. The adaptive routine may be performed during operation of the system to keep the main system parameters close to their optimum value. During adjustment, the system may be divided into separate system portions. The adjustment of each portion may be independent of the other portions of the system. For the optical network system, optimization and priority of the different portions may be assigned based on network channel architecture.

In particular, the present invention is directed to an apparatus and method for adaptive adjustment of parameters of different portions of an optical network system by using five controlled characteristics: Q-factor; Bit Error Rate (BER); histograms of "1" and "0" levels; input optical power; and laser output power. It will be recognized by those of ordinary skill in the art, however, that other key characteristics may also be used in conjunction with the apparatus and method of the present invention.

BACKGROUND OF THE INVENTION

Real-time monitoring of an optical network system is important for controlling and improving the performance of the optical system. One known practice for real-time monitoring involves the use of a local memory, controllers, and look-up-table (LUT) circuits to adjust and to set the main system parameters. The main disadvantage of this method, however, is that this method requires a complicated initial calibration for the optical network channel before using the system.

Similar methods of self-adjustment (alternatively referred to herein as "adaptive adjustment") are also used in practice to adjust the parameters of optical systems. In the system described in U.S. Pat. No. 5,929,982, for example, the adaptive adjustment of APD gain is achieved by adaptive optimization of the receiver signal-to-noise ratio. Specifically, for monitoring purposes, the noise level over some threshold is measured and is used for adaptive setting. However, a drawback of using an adaptive system to adjust the APD gain based on the measurement of noise over some threshold and calculating the signal to noise ratio is that, although this method may give adequate results when the received optical signal has a good quality with a clearly open eye diagram, when the quality of the eye diagram is not good, e.g., when there is optical dispersion in the fiber or there is insufficient signal time jitter, this method may not provide clear results and also may not allow for troubleshooting of faults in the signal link.

SUMMARY OF INVENTION

There is a need in the art, therefore, for an apparatus and method for adaptive adjustment that does not require complicated initial calibration, while providing clear results and allowing for trouble-shooting of faults in the signal link. The present invention solves the above-identified needs, as well as others by providing an apparatus and method for adaptive adjustment of the parameters of different portions of an optical network system by using five controlled characteristics: Q-factor; BER; histograms of "1" and "0" levels; input optical power; and laser output power. These monitored parameters allow for comprehensive troubleshooting of different problems in an optical system operation because different portions of the optical system may be involved in an optical link fault. The use of the five parameters described above allows a user to determine and locate the portion of the system, e.g., the transmitter, the optical fiber, or the receiver, in which the fault occurred.

Other objects, features, and advantages will be apparent to persons of ordinary skill in the art from the following detailed description of the invention and the accompanying drawings.

BRIEF DESCRIPTION OF THE FIGURES

For a more complete understanding of the present invention, the needs satisfied thereby, and the objects, features, and advantages thereof, reference is now made to the following description taken in connection with the accompanying drawings.

DETAILED DESCRIPTION

Figure 1:
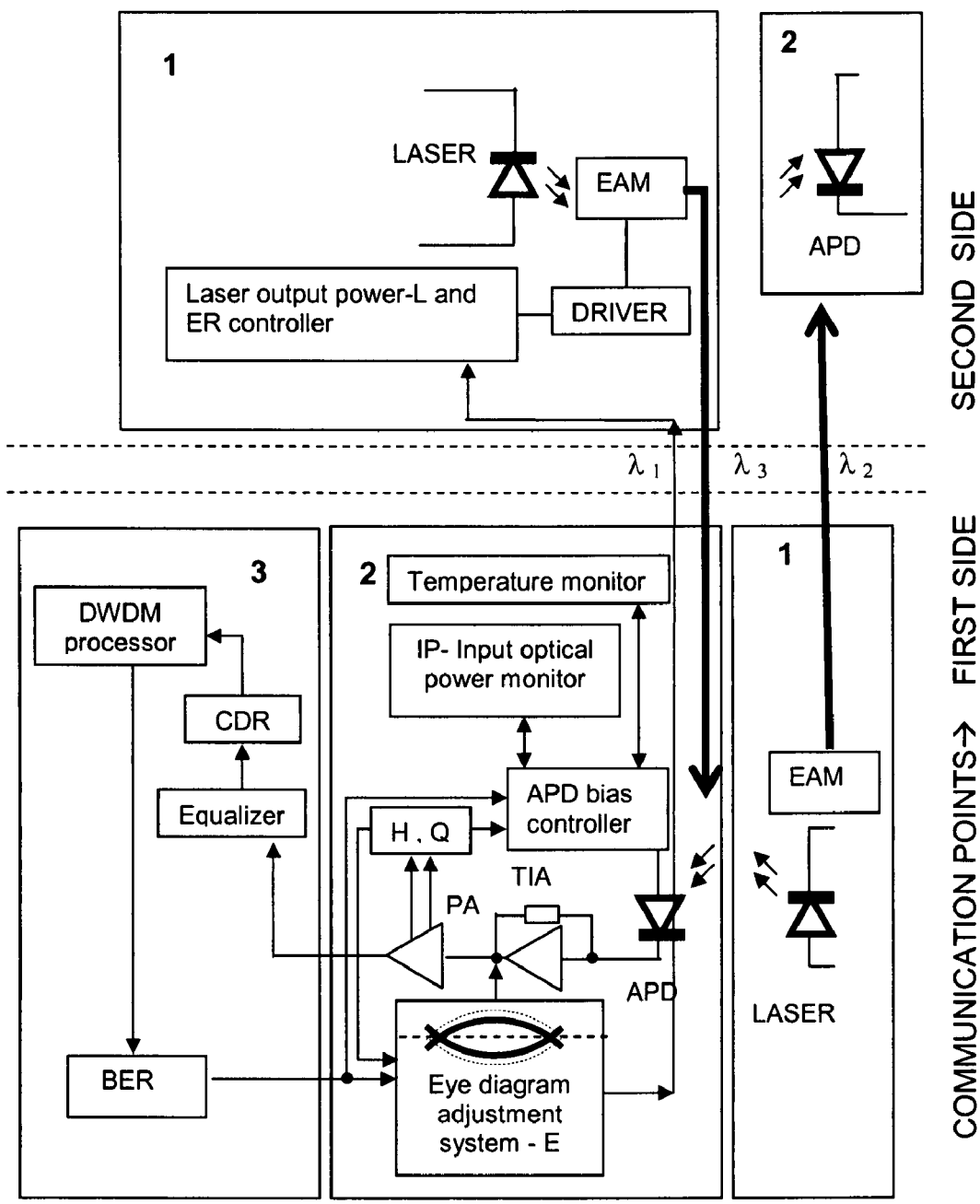
FIG. 1 shows a diagram of an optical network channel that may be used in conjunction with an embodiment of the present invention.

Referring now to FIG. 1, therein shown is the general architecture of an optical network channel, such as a Dense Wavelength Division Mutliplexer (DWDM) channel. Data traffic coming from the source to the destination is transmitted using a wavelength $\lambda_1$ across an optical fiber and is received by the APD receiver on the destination side of the optical fiber. Optical signals $\lambda_2$ and $\lambda_3$ and are transmitted through the fiber to the transmitter side without interfering with the signal transported by $\lambda_1$. For example, $\lambda_1$ may be data traffic $\lambda_2$ and $\lambda_3$ may include a management signal.

For the network system architecture, a set of system parameter-characteristics for adaptive system adjustment can include at least five parameters: Q-factor, represented by block Q; Bit Error Rate, represented by block BER; histograms of "1" and "0" levels, represented by block H; laser output power level; and measured input power level in the receiver, represented by block IP.

The temperature monitor and the APD bias controller are shown as being connected because the optimum high voltage range for the APD, which corresponds to a beneficial gain without too much noise, is affected by temperature. For example, the optimum high voltage may be A at 70 degrees and A+1 at 75 degrees.

The use of these five parameters allows for an accurate adaptive adjustment of the receiver portion, after checking that the input signal coming into the receiver is within an appropriate range for performing precise adaptive adjustment.

In FIG. 1, blocks 1, 2, and 3 correspond to a Laser portion, an APD (Avalanche photo-diode) receiver portion, and a DWDM processor portion, respectively. The laser portion has a continuous wavelength laser that is modulated by an internal modulator. A laser output power is monitored in connection with the extinction ratio (ER) and may be adjusted by a Laser output power controller. The APD receiver portion consists of the APD itself; an APD bias controller block, which maintains the optimal bias voltage at the APD; and Input power and Temperature monitor blocks. The APD receiver portion also has two amplifier stages: the trans-impedance amplifier (TIA) and post-amplifier (PA). The last portion in FIG. 1 is the DWDM processor portion 3. The block Equalizer in this portion is configured to compensate for signal optical dispersion that occurs when transferring optical signals along a long optical fiber. The DWDM may also include a Clock Data Recovery (CDR) unit.

Although FIG. 1 shows the second side including only a laser portion (1) and an APD portion (2), the second side may further include a DWDM portion, similar to the one illustrated on the first side.

Laser Output Power Level "L"

For the purpose of controlling attenuation in the fiber, the monitoring of laser output power level "L" is important in maintaining a desired performance of the system, particularly with respect to the receiver portion to ensure that the level of the input signal is sufficient to perform the adaptive adjustment for the receiver portion. The comparison of the value of the laser output signal (L) with the measured input optical power (IP) permits a determination as to whether a fiber is damaged. Moreover, using the whole set of system parameters and different portions (such as the receiver and the transmitter), gives flexibility and a full set of monitoring features to control the whole network system without disturbing the traffic signals.

Q-Factor "Q"

Q factor is defined as:

$$Q = \text{abs}(\mu_1 - \mu_0)/(\sigma_1 - \sigma_0) \qquad \text{[equation (1)]}$$

where abs means absolute value and $\text{abs}(\mu_1 - \mu_0)$ denotes the separation between the intensity level of a "1" and a "0" of digital signals, and $\sigma_1 + \sigma_0$ is the sum of the standard deviations of the intensities around levels "1" and "0".

Figure 2:
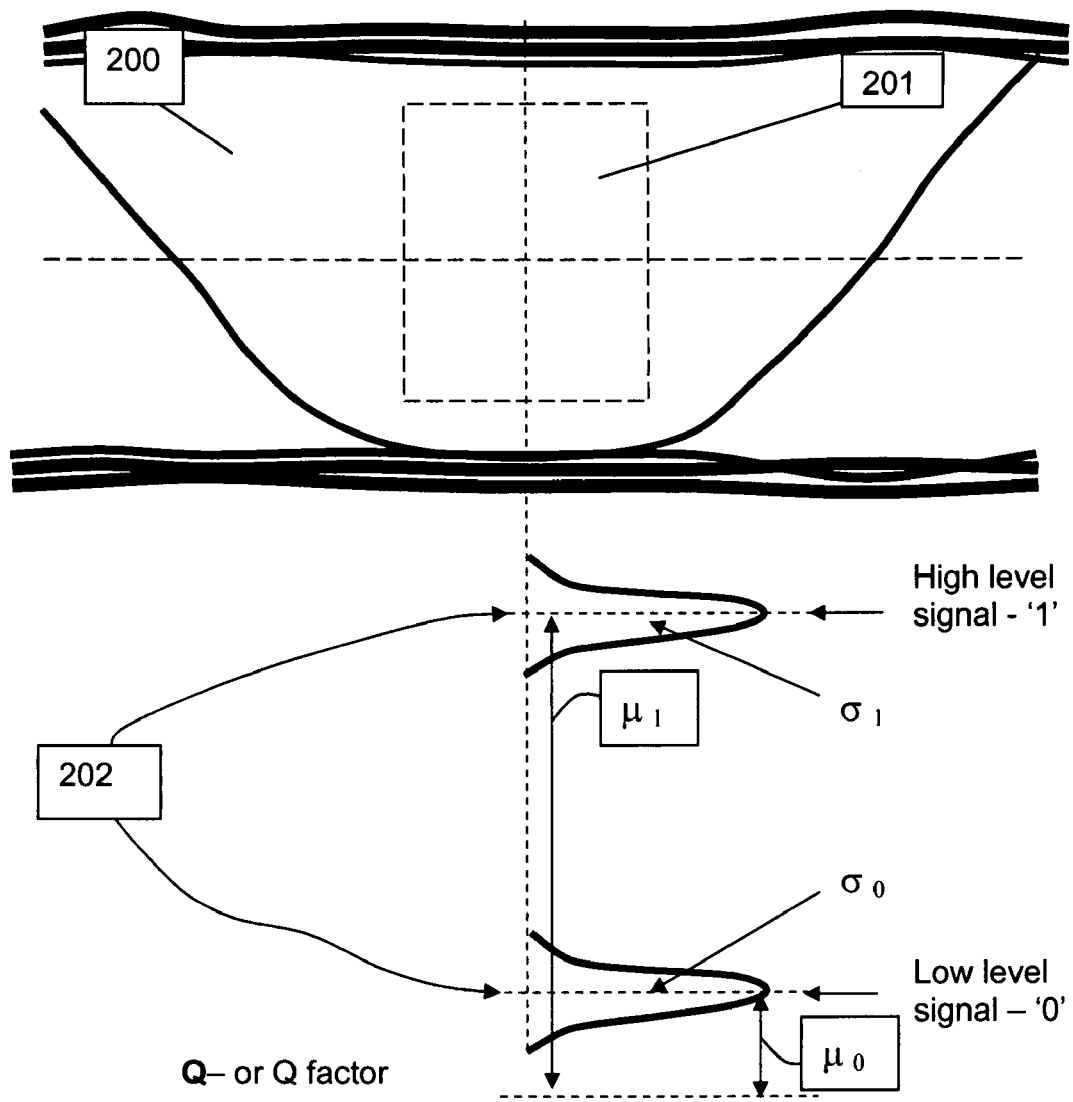
FIG. 2 shows an exemplary eye diagram and its relationship to the Q-factor, as used in conjunction with an embodiment of the present invention.

An example of the relationship between Q and the quality of an eye diagram is illustrated in FIG. 2. An eye diagram is one popular way to present the performance of a digital fiber-optics link by superposition of multiple pulses on an oscilloscope display. In FIG. 2, graph 200 represents the superposition of pulses to generate an eye diagram. The "eye" area is shown as 201, which is the area where there should be no interference between "1" and "0" levels. All "1" pulses should be above the eye area, and the all "0" pulses should be below the eye area. This "eye" area (alternatively referred to herein as a mask) is the standard for different network protocols. Graph 202 represents the intensities of level "1" and level "0" in the center of the eye.

Relationship of Q-Factor to Bit Error Rate "BER"

Based on the Gaussian approximation for the noise distribution in the received signal, the following relationship between Bit Error Rate (BER) and Q is:

$$\text{BER} = \tfrac{1}{2}\text{erfc}(Q/\sqrt{2}) \qquad \text{[equation (2)]}$$

Figure 3:
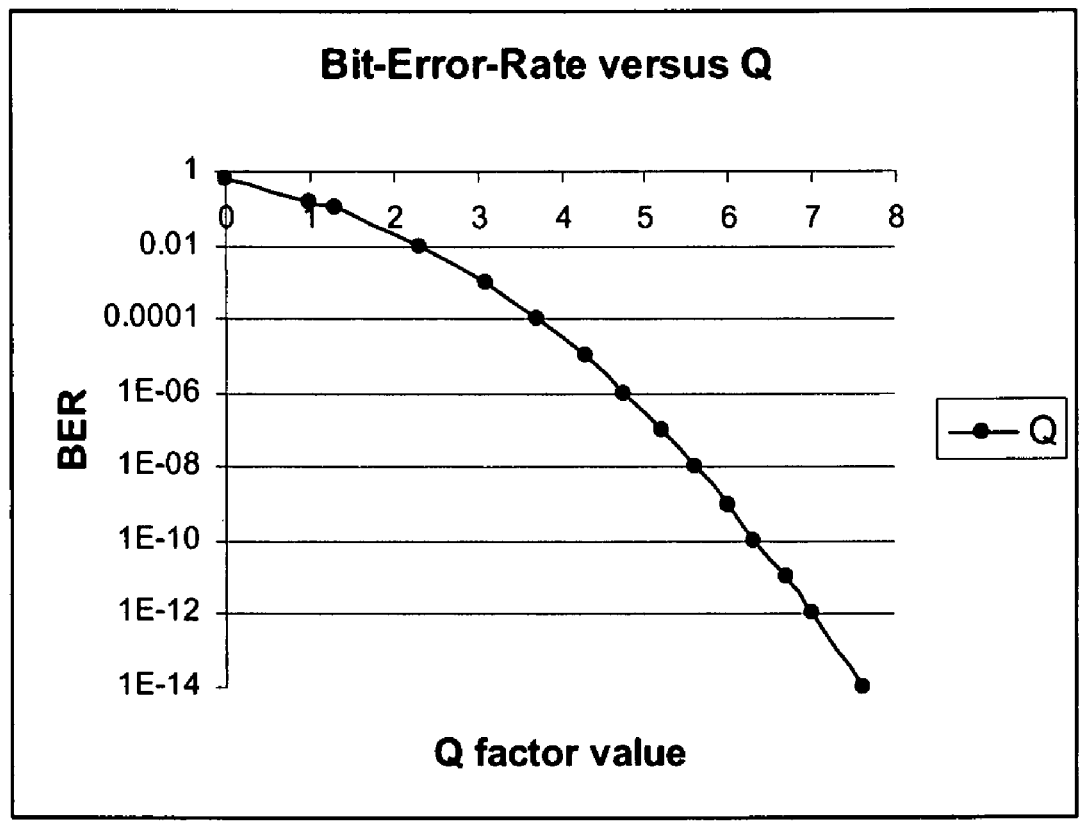
FIG. 3 shows a graph depicting the relationship of BER to the Q-factor value, in accordance with an embodiment of the present invention.

The calculated dependence of BER on the Q value is shown in FIG. 3. Here, erfc is a complementary error function. The direct relationship of BER to the Q value leads to the highest values of Q corresponding to the best BER reached by optical network channels. The only requirement for using equation (2) is that the signal distribution should be pure Gaussian. This provides the option of using only the Q factor for optimizing the system parameters. However, adjustment performed by using only the Q factor may not be precise if the signal distribution is sufficiently non-Gaussian, and the contribution of the other factors, such as optical dispersion and additional pick-up noise, may be taken into account by using other parameters, such as H and BER, to provide an exact solution.

Histograms of Intensities of Level 1 and Level 0 "H"

Figure 4:
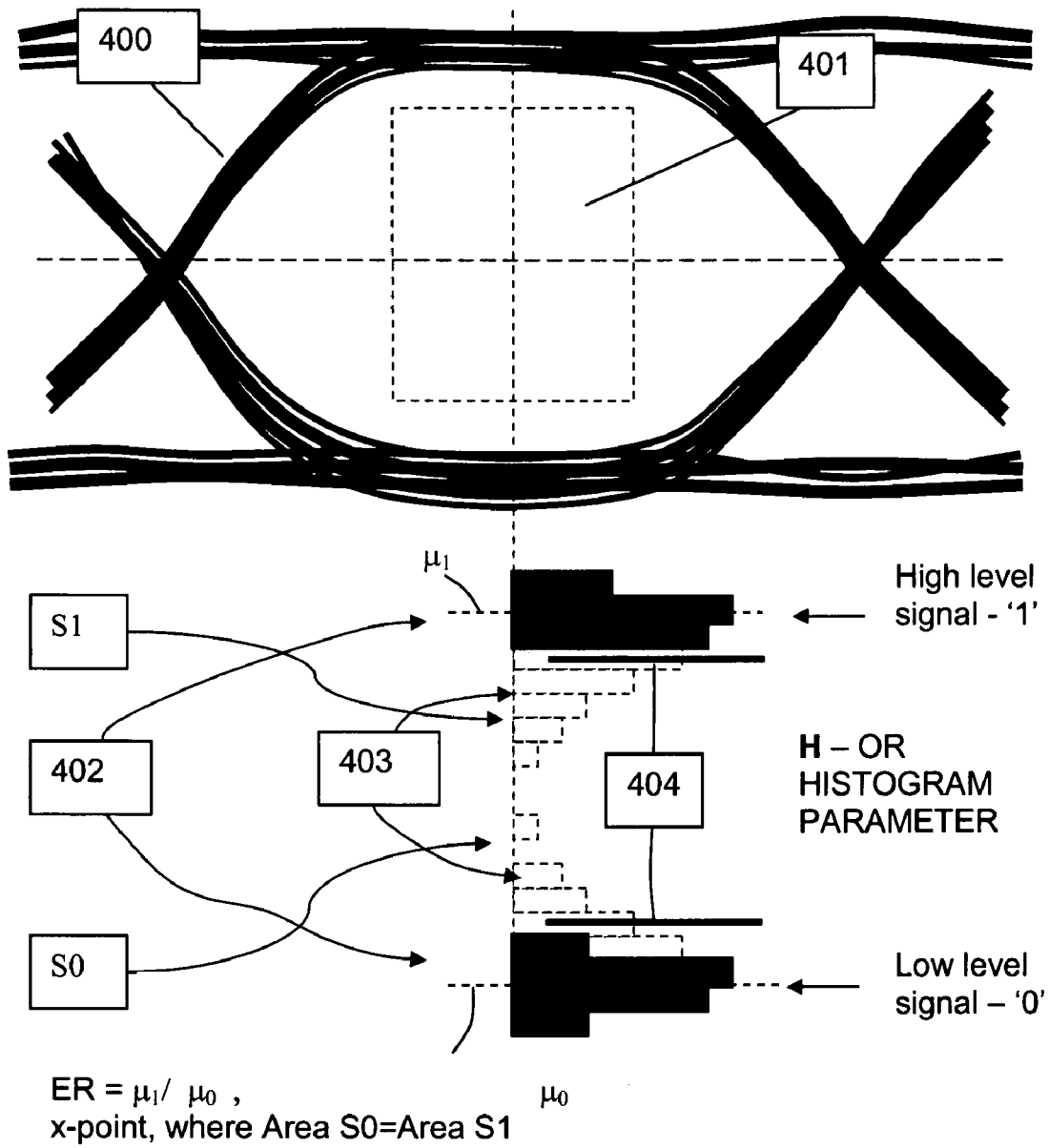
FIGS. 4A and 4B show a diagram of an eye diagram and corresponding histogram, as used in conjunction with an embodiment of the present invention.

Another parameter that may be used for optimization is H, representing real histograms of intensities of level "1" and level "0." The relationship between the signal eye diagram and H is shown in FIG. 4A. In FIG. 4A, Graph 400 represents a signal eye diagram. Graph 401 shows the "eye" area. In FIG. 4B, graph 402 shows the histograms of intensities of level "1" and level "0" in the case of a satisfactory link and a satisfactory eye diagram. In this case, the histogram of intensity of level "1" is in the area above the "eye" area, and the intensity of the "0" level is in the area below the "eye" area. Graph 404 is a graph of the eye area. The point at which the signals cross between level 1 and level 0 is called the crossing point "x". The crossing point is shown with the horizontal dashed line in FIG. 4A. In FIG. 4B, S0 is the area around the low level signal, level 0. S1 is the area around the high level signal, level 1. The crossing point-x in FIG. 4A occurs when the Area of S0 is equal to the area of S1. Typically, an ideal crossing point is approximately halfway between the levels for 1 and 0. However, a crossing point may occur closer to level 1 or closer to level 0. In addition, the system can be adjusted to move the crossing point to a different level. Adjusting the crossing point will affect the crossing of the signal. As the crossing point moves closer to level 1, the system often incurs increased error in determining whether the signal is at a 1 or a 0.

Figure 6:
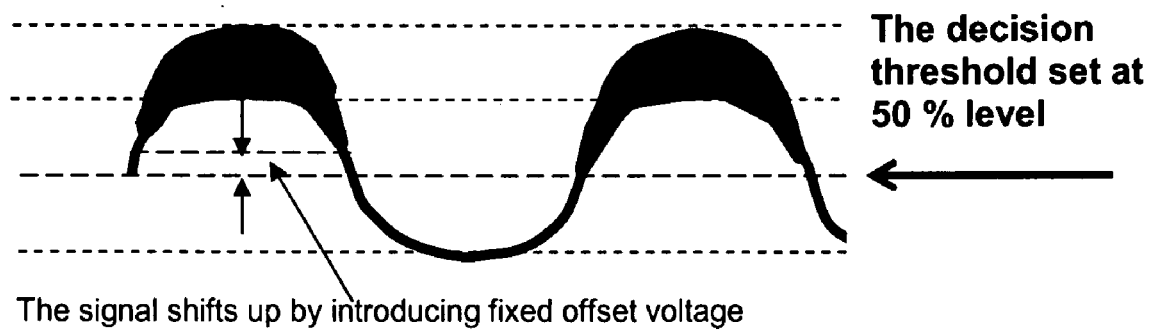
FIG. 6 shows a diagram of an example with noise in one of the standard levels "1" or "0"

FIG. 6 shows an example of a signal that may need the crossing point altered for optimization of the output information, because the signal includes noise only on the upper portion of the signal.

By using H, it is possible to work with eye diagrams in which both level intensities come into the forbidden "eye" area. Graph 403 shows an example of histograms in this scenario. Cleaning of areas 401 and 404 may be the first priority task for adjusting the quality of the eye diagram by measuring histograms (or H, as described in connection with FIG. 1).

Input Power "IP"

Through controlling of the input power (IP) block, shown in FIG. 1 and the laser extinction ratio (ER), a determination can be made as to whether the input signal is at a stage where adaptive adjustment may be performed. For example, in the embodiment shown in FIG. 4, ER is $\mu_1/\mu_0$.

Controlling the input power IP simultaneously with the laser output power L enables a conclusion regarding the quality of the fiber itself or the laser, if laser output power was not set correctly. The relationship to determine the total losses into fiber is:

Insertion loss=$L$−IP [dB]  [equation (3)]

According to another aspect of the present invention, by adaptively adjusting the system by monitoring the whole set of parameters (at least the five aforementioned parameters—Q, BER, H, IP, and L), the comprehensive adjustment of the optical receiver and the troubleshooting of different problems in the system may be accomplished.

Figure 5:
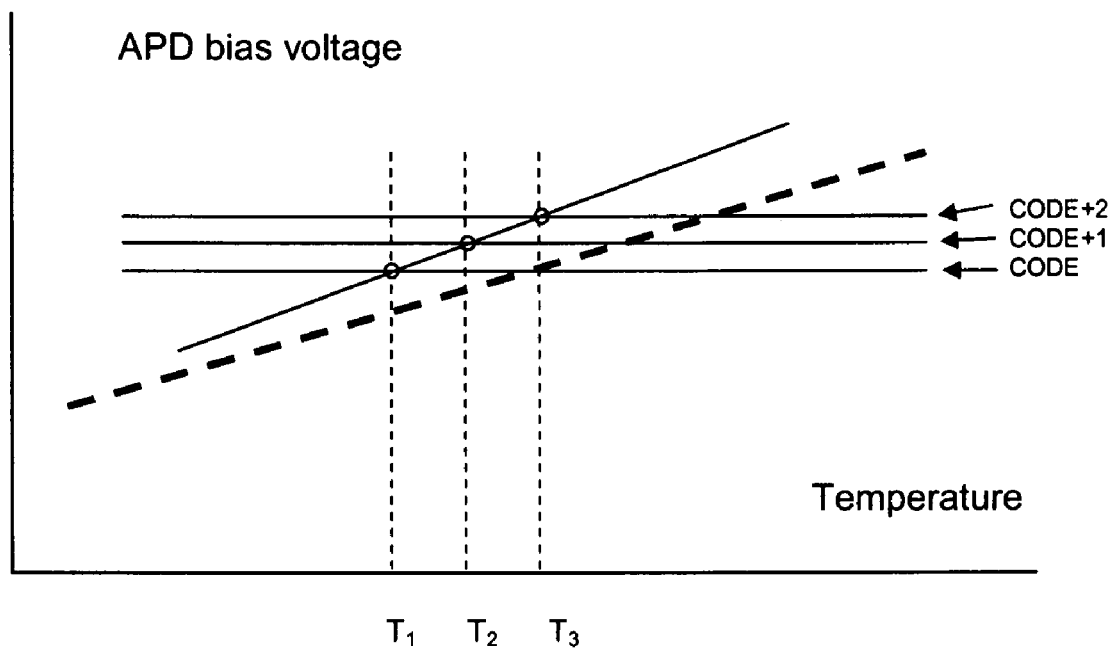
FIG. 5 shows graph depicting the relationship of the APD Bias Voltage to temperature, as used in conjunction with an embodiment of the present invention.

FIG. 5 shows how the adaptive circuit corrects APD bias voltage in accordance with an embodiment of the present invention by making a minimum variation in the input code. The optimal value of APD bias for each temperature ($T_1$, $T_2$ and $T_3$) can be chosen by finding the maximum value of Q. An initial (dashed) curve may be used at the start of adaptive process. This represents a preliminary, rough temperature coefficient curve to be loaded in the memory of the system, after which the system itself can adjust bias voltage.

Referring to FIG. 5, the adjustment of the APD bias voltage by searching for the maximum value of Q as the main parameter (and in addition using the H, BER, IP, and L parameters when the quality of the eye is not sufficient) may also be used to maintain the APD bias voltage temperature compensation.

The APD bias voltage temperature compensation may performed by using a look-up-table. In this way, the linear dependence of the required bias voltage versus the temperature is loaded in the memory, and the system itself sets the bias voltage corresponding to the measured temperature. The main disadvantage of this method, however, is that this method requires a complicated initial calibration for the optical network channel before using the system.

One substantial advantage of using adaptive adjustment is that initially, only a preliminary, rough temperature coefficient curve needs to be loaded, and then the system itself can adjust bias voltage. An additional advantage of the apparatus and method according to the present invention is that when some of the parameters of the APD receiver are altered, the system itself can correct these changes without stopping operation.

The decision threshold for the eye diagram may be adjusted by optimizing BER and, in addition, by optimizing H, Q, IP, and L. If one of the standard levels "1" or "0" is very noisy (see, e.g. FIG. 6), it is possible to set additional offset voltages to decrease the amount of BER degradation. FIG. 6 shows additional noise at the top level, for example, level 1. For this task, the adjustment of the offset may be performed by looking for an optimum BER. In FIG. 6, the wide dashed line that crosses the entire length of the signal is the decision threshold set at 50%. Thus, the determination of whether the signal is at level 1 or at level 0 is made at the threshold approximately midway between the levels. FIG. 6 also illustrates introducing a positive offset to decrease the decision threshold level, shown as the wide dashed line that crosses the first upper portion of the signal. Adding a positive increase to the decision threshold should decrease the amount of errors in the level determination.

The characteristics of the laser portion of the system may be optimized by defining an optimal BER, adaptively changing the laser output power parameter L, and adjusting the Extinction Ratio (ER). ER is defined from histogram measurements as ER=$\mu_1/\mu_0$. Cooled Transmitter Optical Sub-Assembly (TOSA) is commonly used for 10 Gbps long reach applications. TOSA consists of a Distributed Feedback Continuous Wavelength (DFB CW) source optically coupled to a monitoring diode that is monolithically integrated with Electro Absorption Modulator (EAM), as it is shown in FIG. 1. High frequency signals carrying 10 Gps traffic are applied to the EAM input using commercially available EAM drivers with integrated bias circuitry. The last one is used to change modulation and ER of the optical signal as well as average output power L.

Figure 7:
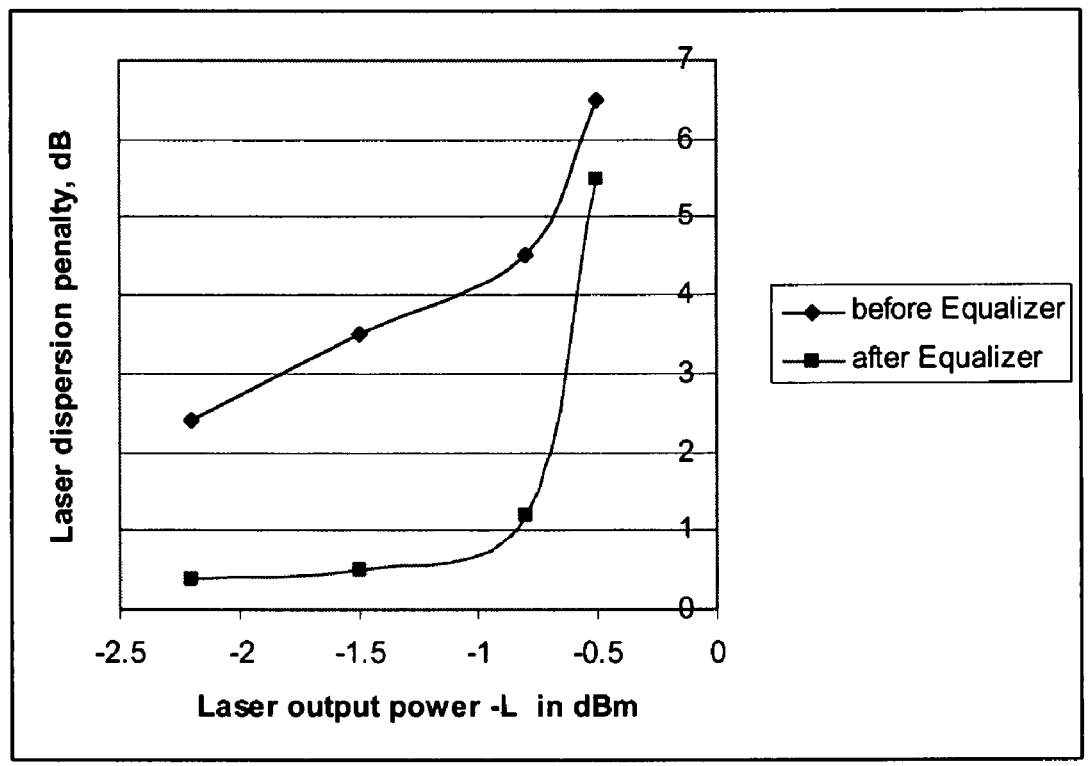
FIG. 7 shows a graph comparing laser characteristics before and after equalizing according to an embodiment of the present invention.

FIG. 7 illustrates an exemplary optimization of laser characteristics that can be achieved with the present invention. The upper curve shows laser dispersion penalty versus laser output power L before the Equalizer stage and the lower curve shows the same characteristic after the Equalizer stage. Usually, in such TOSA transmitters, an increase in L, the laser output power, causes a rapid increase in a dispersion penalty, represented by the upper line in FIG. 7. If a compensation of the dispersion penalty in the system takes place, the equalizer block can compensate for the dispersion penalty in the field where the value of the dispersion penalty does not exceed the equalizer circuit specification limits. The compensated dependence is shown in FIG. 7 by the lower line. The system power budget can be defined as the sum of two main contributions—receiver sensitivity (−30 dBm) and the laser output power minus the dispersion penalty:

Power budget=−30 dBm+$L$−dispersion penalty  [equation (4)]

Figure 8:
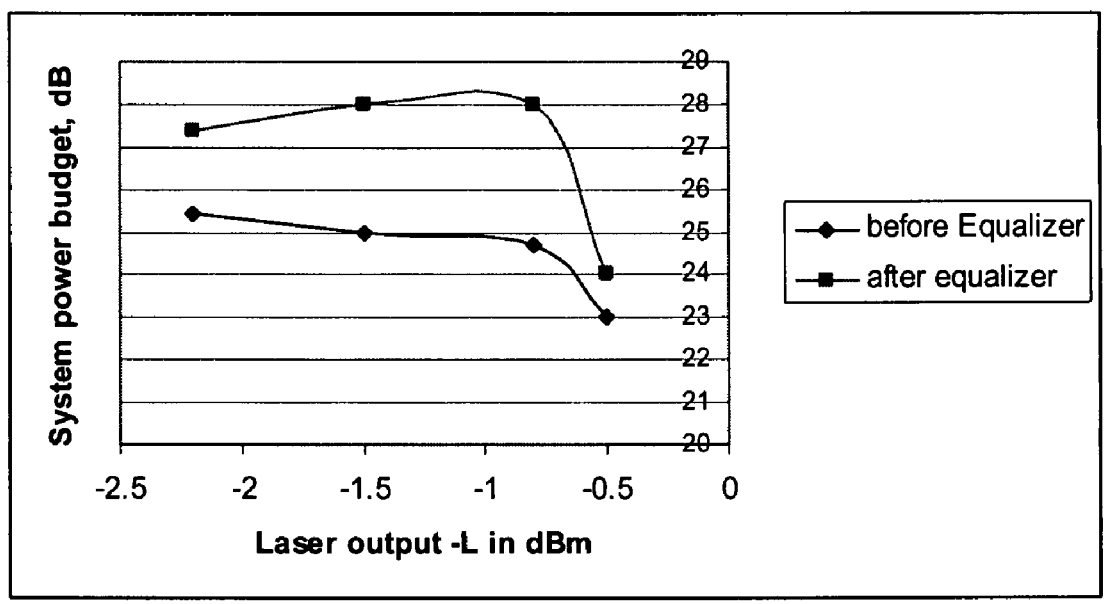
FIG. 8 shows a graph comparing the system power budget before and after equalizing according to an embodiment of the present invention.

The power budget curves for cases before and after the equalizer stage are shown in FIG. 8. The case "after Equalizer" has a clear local maximum. This fact can be used for adaptive optimization of the L parameter value.

Figure 9:
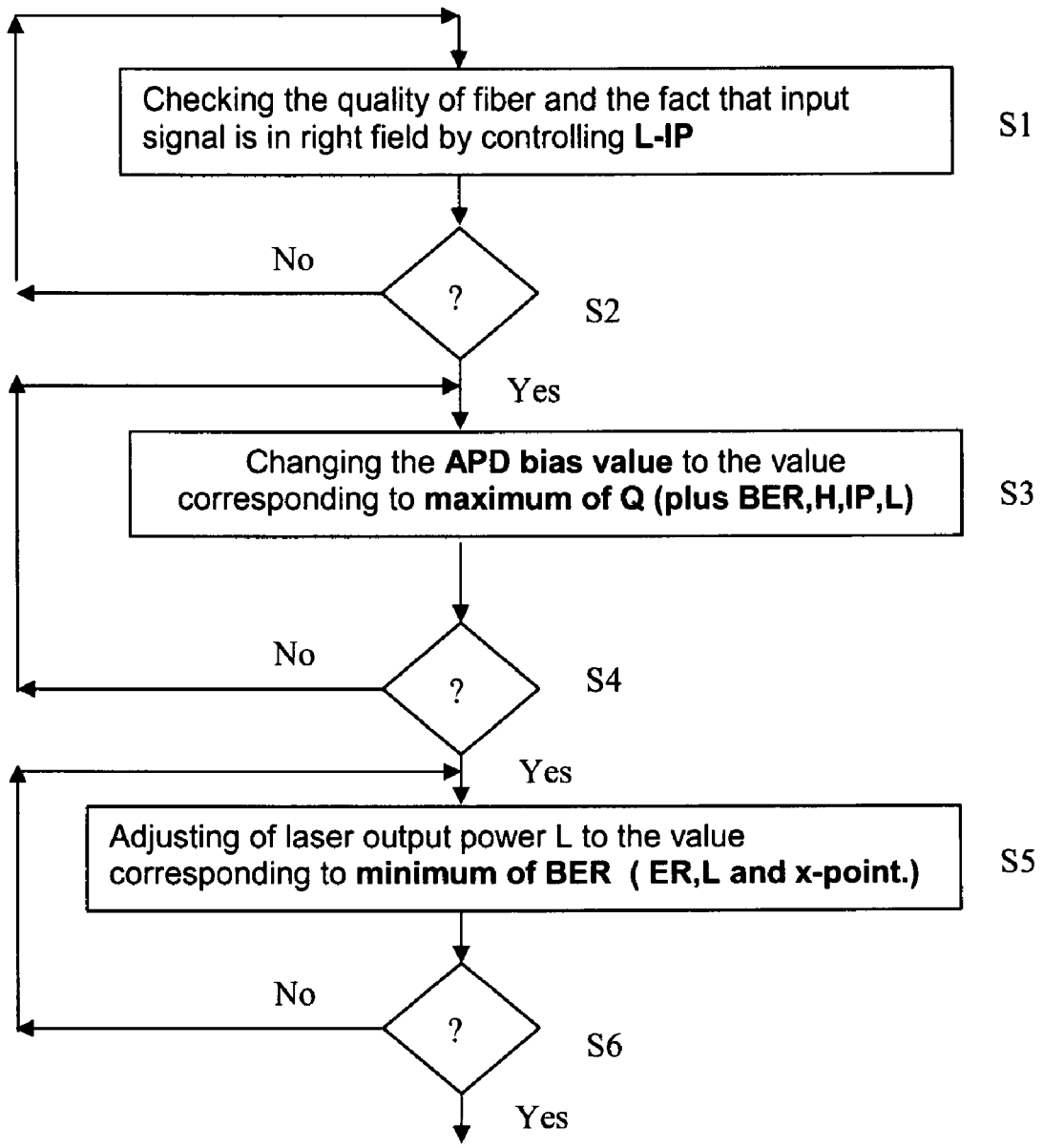
FIG. 9 shows an exemplary diagram of a task flow for a whole receiver system adaptive adjustment according to an embodiment of the present invention.

In one embodiment, the adaptive adjustment of each portion of the system does not affect or substantially affect other portions of the system and can be done individually based on a predetermined or selected priority. The adjustment of each portion may be independent of the other portions of the system. For the optical network system, the optimization and the priority of different portions may be assigned based on network channel architecture. FIG. 9 illustrates an exemplary embodiment of a task flow for the whole receiver system adaptive adjustment.

In step S1 of FIG. 9, the quality of the fiber is checked based on signal degradation. By controlling the input power (IP) block and the laser output power (L), a determination can be made regarding the insertion loss and the quality of the fiber. In addition, a check can be made regarding whether the input signal is in the correct field.

At step S2, a determination is made as to whether the quality of the fiber is good based on the information from S1. If the fiber is determined to be not good, a report is made to the operator that the fiber is not good quality, and the quality of the fiber continues to be monitored. If the fiber is determined to be good, the adaptive adjustment moves to step S3

At step S3, the APD bias is altered to provide a corresponding maximum Q value. In addition to providing a maximum Q value, the BER, H, IP, and L parameters may be altered for optimum functioning of the system.

At step S4, a determination is made as to whether the Q value is at a maximum. This is a determination made for the receiver side. If the Q value is not at a maximum, the parameters will again be adjusted. An error message may be sent. In one example, however, no error message is sent, and the parameters are automatically adjusted after a determination is made regarding the Q value. If the Q value is at a maximum, the system continues to step S5.

At step S5, an adjustment is made to the laser output power, L, to bring it to a value that provides a minimum of BER. This may involve the extinction ratio ER, laser output power L, and crossing point x.

At step S6, a determination is made as to whether the BER is at a minimum. The previously made adjustments affect the transmitter side of the system. If the BER is not at a minimum, the adjustments in step S5 continue. If the BER is at a minimum, the system continues with optimum quality, and the adaptive adjustment goes to an idle mode.

Thus, the adaptive adjustment involves checking and adjusting for the quality of the fiber, checking and adjusting parameters that affect the receiver side of the system, and checking and adjusting parameters that affect the transmitter side of the system.

Figure 10:
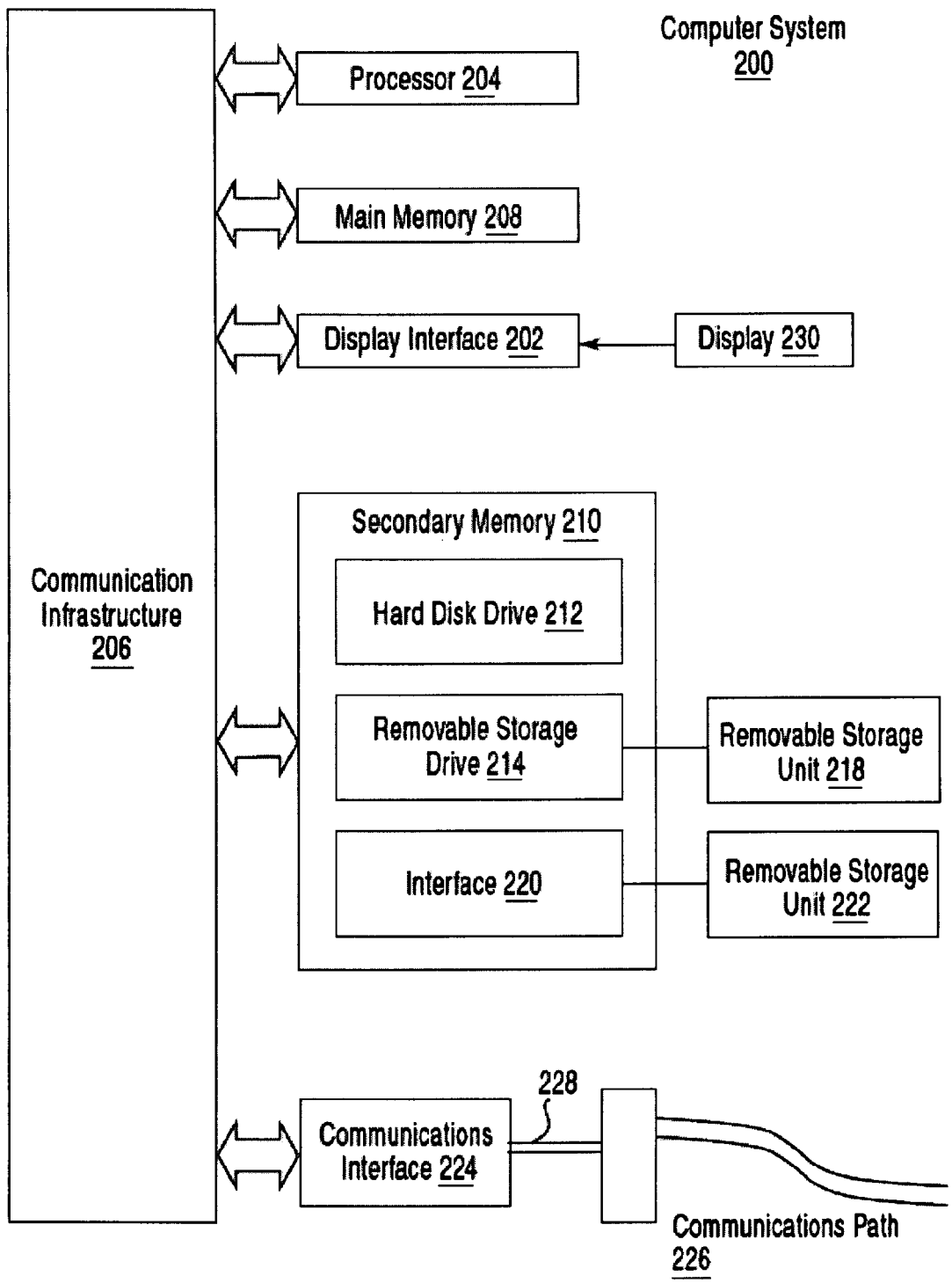
FIG. 10 shows an exemplary system diagram of various hardware components and other features, in accordance with an embodiment of the present invention.

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 200 is shown in FIG. 10.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 11:
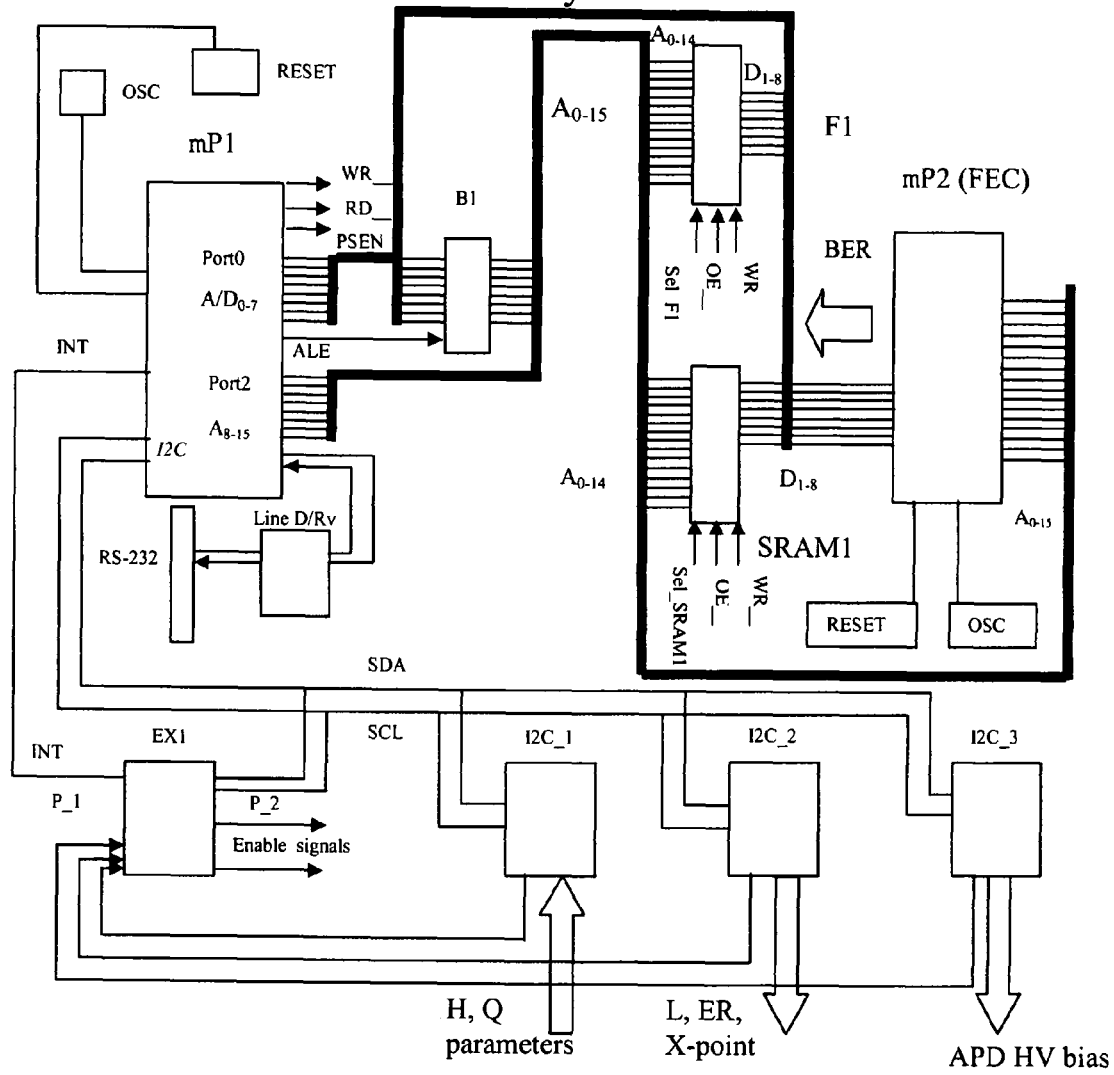
FIG. 11 shows an exemplary system diagram of various hardware components and other features, in accordance with an embodiment of the present invention.

FIG. 11 shows an exemplary embodiment of a system 300 incorporating the present invention. The system in FIG. 11 is designed to set the parameters for both the main laser and the APD. The APD parameters may include the APD high voltage level, the power, extinction ratio, and crossing point x of the laser. The system in FIG. 11 is designed to set these parameters with control and adaptive adjustment in order to obtain an optimum BER. Initially, predetermined parameters are introduced into a microcontroller mP1 for setting various parameters of the system through a serial port connector RS-232 interface. The port connector RS232 may connect to a PC or other device having a processor. These predetermined parameters are initial guess parameters, which may provide optimum performance, yet do not require extensive initial calibration. The initial predetermined parameters are converted to a required format and transferred through bus I2C (Interface-To-Chip or chip-to-chip interface) to a plurality of registers of drivers, an interfacing laser, and an APD.

Microcontroller mP1 may include a plurality of I/O ports and memory addressing capability. For example, mP1 may be an 8-bit engine with memory addressing capability of 64 k (16 bit). In one embodiment, mP1 includes the following four I/O ports: Port 0 that provides address/data A1-8/D1-8; Port 2 that provides MS bits of address space A9-16; Port 1 for serial communications, for example with the I2C bus; and Port 3 for RS232, RD, WR, and program store enable (PSEN) commands.

Port 1 of microprocessor mP1 is interfaced through a 2-wire connection with the following chips: I2C_1 for measuring the histogram H and for measuring Q for the system; a Digital-to-Analog Converter I2C_2 that sets the output power L, extinction ratio ER, and the crossing point x for the laser; and a Digital-to-Analog converter I2C_3 that controls the high voltage HV of the APD. The system includes an oscillator OSC; reset circuitry RESET; a line D/Rv for a transmitter/receiver; and a remote I/O expander EX1 for bus I2C. EX1 may be a 16 bit expander.

After a power ON, the oscillator OSC begins to feed a clock, for example a 16 MHz clock, and the RESET system provides a reset function. The reset function may be provided either manually or by the power ON transition. Then, saved parameters and compiled code that reside in flash memory F1 are booted into mP1. The Expander EX1 generates an INT signal, because of transitions appearing on port1 of EX1. This causes mP1 to provide Enable signals to port 2 of EX1 and default settings for the laser and APD parameters to write through the I2C interface into the I2C_2 and I2C_3 chips. I2C_1 may be an ADC that measures a histogram H and Q, for example.

During real traffic, the BER and the numbers of correctable and noncorrectable errors are evaluated by a processor mP2, and the data is transferred through the A/D buses to SRAM1. Processor mP2 is a networking processor providing the BER. For example, mP2 may be an 8 bit networking processor. mP1 reads BER measurements and issues commands to correct the laser and/or APD settings. Firmware may actively use the SRAM1 to exchange data and results of calculations made during execution. In system 300, B1 is a latch with 3 state outputs, such as an octal transparent latch.

The system 300 includes flash memory F1 and static RAM memory SRAM1. For example, F1 may be 256 kb (32 k*8 bits) of flash memory and SRAM1 may be 32 k*8 bits of memory. Flash memory F1 may perform two functions. First, the flash memory F1 may boot the program code after the power ON. For example, the flash memory F1 may reset the vector of mP1 points at 0000h. Second, the flash memory F1 may run the application program code, which resides in the flash memory. There may be different access times for F1 and SRAM 1.

In an exemplary embodiment, the program counter of mP1 has 16 bits. Then, if the program code is 64 k size, half of the code may be stored in 32 k bytes of flash memory. Flash memory F1 may be mapped to occupy the lower half of the addressable space (0-7FFFh), while the SRAM1 may be mapped to occupy the upper half of the addressable space (8000h-FFFFh), so that usage of F1 and SRAM2 match the addressable space of the microcontroller.

In the embodiment illustrated in FIG. 11, system 300 adaptively applies small changes to key portions of the APD and laser by controlling a main set of parameters. The adaptive routine may be performed during operation of the system in order to keep the main system parameters close to their optimum value.

Example embodiments of the present invention have now been described in accordance with the above advantages. It will be appreciated that these examples are merely illustrative of the invention. Many variations and modifications will be apparent to those skilled in the art.

What is claimed is:

1. A method of adaptively adjusting an Avalanche photo-diode (APD) optical receiver and laser system, the method comprising:
   determining a value for at least one of a Q-factor, an optimal Bit Error Rate (BER), an intensity level "1" and "0" on a histogram H of input signal power, an input optical power, and a laser output power;
   adjusting at least one parameter from the group consisting of the Q-factor, the optimal BER, the intensity of level "1" and "0" on a histogram H of input signal power, the input optical power, and the laser output power; and
   determining the quality of a fiber by controlling the laser output power and the input optical power; wherein
   when the fiber is determined to be of bad quality, adjusting the quality of the fiber; and
   when the fiber is determined to be good quality, continuing monitoring and adaptive adjustment of the system parameters.

2. The method of claim 1, further comprising dividing the system into separate portions and adjusting each portion independently of the other portions of the system.

3. The method of claim 2, further comprising determining a priority to be assigned to a portion of the system based on network channel architecture; and adjusting each portion in an order based on the priority of the portion.

4. The method of claim 1, further comprising:
   determining a maximum Q value and adaptively adjusting the APD bias to correspond to the maximum Q value.

5. The method of claim 4, further comprising:
   adaptively adjusting at least one of the H, input optical power, and laser output power corresponding to the maximum Q value.

6. The method of claim 5, further comprising:
   adaptively adjusting the laser output power to correspond to a minimum BER.

7. The method of claim 6, further comprising:
   adaptively adjusting at least one of the extinction rate and crossing point to correspond to a minimum BER.

8. The method of claim 4, further comprising:
   adaptively adjusting the laser output power to correspond to a minimum BER.

9. The method of claim 8, further comprising:
   adaptively adjusting at least one of the extinction rate and crossing point to correspond to a minimum BER.

10. An Avalanche photo-diode optical receiver and laser system comprising:
    an APD portion;

a laser portion; and a processor portion, wherein the system is configured to:

adjust at least one portion of the system through controlling at least one parameter from the group consisting of a Q-factor, an optimal Bit Error Rate, an intensity for level "1" and "0" on a histogram H of input signal power; an input optical power, and a laser output power; and determine the quality of a fiber by controlling the laser output power and the input optical power; wherein when the fiber is determined to be of bad quality, the quality of the fiber is adjusted; and when the fiber is determined to be good quality, the system parameters continue to be monitored and adaptively adjusted.

* * * * *